(12) United States Patent
Kliffken et al.

(10) Patent No.: US 6,630,808 B1
(45) Date of Patent: Oct. 7, 2003

(54) METHOD OF ELECTRONICALLY MONITORING AND CONTROLLING A PROCESS FOR THE ADJUSTMENT OF MOBILE PARTS

(75) Inventors: Markus Kliffken, Buehl (DE); Joerg Wolf, Karlsruhe (DE); Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/980,410
(22) PCT Filed: May 5, 2000
(86) PCT No.: PCT/DE00/01425
§ 371 (c)(1), (2), (4) Date: Mar. 4, 2002
(87) PCT Pub. No.: WO00/74195
PCT Pub. Date: Dec. 7, 2000

(30) Foreign Application Priority Data

Jun. 2, 1999 (DE) .......................................... 199 25 372

(51) Int. Cl.$^7$ ................................................ H02P 7/00
(52) U.S. Cl. ...................... 318/466; 318/468; 318/282; 318/286; 318/266; 318/268; 49/26; 49/28
(58) Field of Search ................................. 318/466, 468, 318/266, 268, 282, 286, 469; 49/26, 28

(56) References Cited

U.S. PATENT DOCUMENTS

| | | | | |
|---|---|---|---|---|
| 5,278,480 A | * | 1/1994 | Murray ........................ | 318/626 |
| 5,410,226 A | * | 4/1995 | Sekiguchi et al. .......... | 318/266 |
| 5,436,539 A | * | 7/1995 | Wrenbeck et al. .......... | 318/265 |
| 5,774,046 A | * | 6/1998 | Ishihara et al. ............. | 340/438 |
| 5,982,124 A | * | 11/1999 | Wang ........................... | 318/466 |
| 6,005,361 A | * | 12/1999 | Grinewitschus et al. .... | 318/469 |
| 6,100,658 A | * | 8/2000 | Kume et al. ................. | 318/286 |

FOREIGN PATENT DOCUMENTS

| | | |
|---|---|---|
| DE | 196 01 359 A | 7/1997 |
| DE | 196 33 941 A | 2/1998 |

* cited by examiner

Primary Examiner—Bentsu Ro
Assistant Examiner—Rina I. Duda
(74) Attorney, Agent, or Firm—Michael J. Striker

(57) ABSTRACT

The method of electronically monitoring and controlling a process for moving and/or positioning at least one window and/or sunroof of a motor vehicle to provide protection from pinching includes supplying an input variable, for example drive voltage, and an output variable, for example window position, to a detection device; storing a model in the form of a differential equation describing the process for moving and/or positioning the window and/or sunroof in terms of process parameters in the detection device; optimizing the process parameters of the model according to the input and output variables and storing values of the optimized process parameters in the detection device for the purpose of monitoring; continually evaluating current values of the process parameters obtained by the optimizing by comparing the current values with the stored values; calculating a process correcting quantity in the detection device for adjusting the window and/or sunroof according to the comparing and influencing the process by feeding the correcting quantity into the process, so that the process can be halted when pinching is detected.

16 Claims, 3 Drawing Sheets

METHOD OF ELECTRONICALLY MONITORING AND CONTROLLING A PROCESS FOR THE ADJUSTMENT OF MOBILE PARTS

BACKGROUND OF THE INVENTION

1. Field of the Invention

The invention relates to a method for electronically monitoring and controlling a process for adjusting movable parts, in particular windows and tilt/slide sunroofs of a motor vehicle, to ensure protection against pinching.

2. Description of the Related Art

The methods for realizing protection against pinching known to date can be roughly classified into direct and indirect methods.

In the direct methods, the pinching force is measured explicitly using appropriately-placed sensors. When a specified threshold value is exceeded, the drive is stopped or reversed. "Sensor strips" that are integrated in the seals of the stop are often used in these methods. The disadvantage of direct methods lies in the high instrument-related expenditure and the relatively poor reliability and resistance to ageing processes.

The current indirect methods are based on the evaluation of other measured quantities that are associated with the force. Such measured quantities are typically the current flowing through the drive, the drive speed of the moved part, or the speed of a rotating part of the drive.

The indirect methods make use of the fact that the measured quantities associated with the force also change when pinching occurs and are therefore suited to early detection of the pinching state. They also involve a high technical expenditure, however, and are basically susceptible to changing external influences. Vehicle movements, temperature and weather fluctuations, or ageing processes, for example, must also be taken into account.

Although reliability can be increased using a combination of both methods, this also causes the technical expenditure to increase even further.

SUMMARY OF THE INVENTION

The method according to the invention for electronically monitoring and controlling a process for adjusting movable parts having the features of the primary claim has the advantage that considerably greater reliability as well as a much higher sensitivity and speed is achieved with a lower technical expenditure.

The method is based on a completely new approach which is based on a physical description of the adjustment procedure. This description takes place based on a model that reflects—either completely or at least essential parts of—the adjustment procedure and is stored in a detection device. Using this model, typical process variables are found and optimized with consideration for measured input and output variables that are characteristic for the process. The process variables can be found on an analytical or iterative basis, for example.

By evaluating the typical process variables by means of comparison with process variables stored in the detection device, a deviation of the course of the process from normal behavior can not only be recognized unequivocally and with maximum sensitivity, it can also be interpreted in differentiated fashion.

Depending on the evaluation, a particular correcting quantity for the process is determined that is fed to the process and influences it. For example, if the process variables signal that a human hand is being pinched in a window or tilt/lift sunroof closing procedure, the correcting quantity will then influence the process in such a way that the electronic drive is reversed or stopped, for example. It is also conceivable that, when a partial sluggishness is detected, the process is influenced so that current flowing to the motor is temporarily increased.

The method described in claim 1 for finding and optimizing certain process variables represents a particular method for the real-time evaluation of a measured course of a value. This real-time evaluation ensures immediate access to variables that cannot be measured directly that are extremely relevant for monitoring the procedure and that contain important information.

Advantageous further developments of the method according to the primary claim are possible by means of the measures indicated in the subclaims.

It is advantageous, for example, if the model describing the process and stored in the detection device depicts the mechanical or hydraulic/pneumatic processes, because this is necessary in order to monitor the adjustment procedure.

It is furthermore advantageous if the model contains the Newtonian equation in the general, vectorial form $$m \cdot \ddot{x} = \vec{F}$$

In this equation, m is a mass, such as the mass of the movable part, and F is the sum of acting forces, for example, the forces that act on the movable part. The quantity F can be dependent on various parameters, such as state variables such as the location x or one of the derivatives with respect to time of x, and on particular damping and friction parameters.

In a more particular form, the equation can take on the form:

$$m \cdot \ddot{x} = \tilde{C} \cdot I + d \cdot \dot{x} + c \cdot \bar{x} + \vec{F}_d + m \cdot \vec{g}$$

This equation describes a movement of a movable part that can be subject to a damping d, a spring stiffness $c=c(t)$, a driving force $F_D = C \cdot I$, and a disturbing force $F_d$.

Of primary importance to the method according to the invention is not to solve the differential equation shown above, that is, to find the function x(t), but rather to find and optimize process variables in a first method variant that are relevant to the detection of the pinching process and its differentiated interpretation, i.e., the parameter c and d, in particular, or variables dependent thereon.

In a further variant of the method, instead of the parameters c and d, at least one output variable is calculated with consideration for the structure of the type of differential equation shown hereinabove and compared with the appropriate measured output variables.

In parallel with the real procedure, therefore, a simulation takes place that also makes it possible to reliably detect a deviation from the normal case and, in particular, a pinching process.

Both method variants are described in greater detail hereinafter.

The differential equation of the model stored in the detection device is not limited to a particular form; the only important thing is that it can be used to describe the mechanical or hydraulic/pneumatic processes. It can also take further disturbance variables into account, for example, or be transformed into the frequency response range, for instance, in alternative representations. It is also feasible that the model depicting the various processes is only composed of data fields from which the optimal typical process variables can be taken and compared with the calculated process variables.

A further advantage arises when a differential equation is included in the model for describing the adjustment procedure or the opening and closing procedure that describes the current build-up in the electronic drive.

An equation of this type for the driving force $F_D$ having the general form $$F_D = f(E, I)$$

provides a relationship between the mechanical and electric variables for describing the adjustment process.

A possible differential equation for permanent-magnet d.c. motors has the general form $$\overline{C} \cdot \ddot{x} = -(L \cdot \dot{I}) + E + R \cdot I$$

Using the equation shown hereinabove for current build-up, the aforementioned relationship between the mechanical variables of the motion equation and the electric variables, that is, the current I flowing through the electronic drive, the electrical voltage E at the drive, and the electrical resistance R of the drive, can be created.

The voltage E at the electronic drive can therefore be used in advantageous fashion as input variable for the method according to the invention.

The following are suited as the output variables fed to the detection device: the current I flowing through the electronic drive and/or the position x of the movable part and/or an angular position $\phi$ of a rotating part of the electronic drive proportional to position x and/or one of the derivatives with respect to time of position x or the angular position $\phi$ or a suitable combination of the aforementioned variables.

The first variant of the method is described hereinafter in general form, in which the finding and optimizing of the process variables is carried out based on the "parameter identification model".

Within the framework of this variant, the parameters characteristic for the adjustment process or the opening and closing procedure, namely the spring stiffness c and the damping term d or variables dependent thereon, are calculated and optimized. The optimization process takes place based on the model describing the process with consideration for the measured input and output variables, wherein the output variables corresponding to the measured output variables are calculated in the detection device. The parameters c and d are then adapted in such a fashion that the calculated output variables agree with the real, measured output variables as well as possible.

In other words, a set of parameters is determined based on measured data, by means of which a deviation from the normal course, e.g., a pinching process, can be identified with great reliability.

The two parameters c and d, that is, the spring stiffness c and the damping term d, increase very rapidly if pinching occurs and are particularly well-suited for monitoring an adjustment procedure and for detecting a pinching process. If the calculated and optimized parameters change, particularly the spring stiffness c, it is to be assumed that an a normal state, such as a pinching state, is present, and measures can be initiated to reverse or stop the electronic drive.

A further advantage of this method variant lies in the fact that, by optimizing the relevant parameters, the pinching process can be evaluated in differentiated fashion. For example, the absolute value of the parameter c or its development over time explains whether a soft or hard object is being pinched. It is possible to detect, for example, whether relatively soft body parts of a human being, such as the neck, or relatively hard body parts, such as the head, are located between the window and the window frame. Typical values of the parameter c are also available for human appendages, so that pinching processes of this nature can also be detected.

Using the absolute value of the damping parameter d or its development over time, certain system variables can be specifically inferred, such as whether sluggishness is simply present at a certain location that does not represent a pressing risk of pinching.

This differentiated interpretation not only makes it possible to reliably detect unequivocal pinching situations, but also to take optimal measures to eliminate them. Additionally, it makes it possible to adapt the system to changing conditions, such as raising the threshold value for stopping or reversing the drive in cases of non-critical sluggishness.

The finding and optimizing of both parameters, the damping d and the spring stiffness c, can be improved even further if a disturbance variable $F_d$, that is, external forces caused by vehicle motions, for example, are also determined. If these disturbance variables can be successfully filtered out, then a higher degree of accuracy and sensitivity is achieved.

In a second advantageous variant of the method, the continuous optimization of the typical process variables is carried out based on the "observation model". Within the framework of this second variant, it is not the system-determining parameters of spring stiffness c and damping d that are optimized, but rather a finding and optimizing of certain and at least one output variable.

The principle on which this variant is based on a simulation of the adjustment procedure or the opening and closing procedure in the detection device that takes place in parallel with the real procedure. In order to start this real-time simulation, an measured input variable is required, with which an output variable is calculated. The calculation of the output variable can be continuously corrected by also taking the measured output variable into account. The degree of accuracy of the simulation is therefore successively increased.

A calculated system variable is optimally adapted to a measured system variable in this case as well, exactly as it is in the first method of parameter identification. "Residues" are formed for the actual detection of the pinching process that reflect the difference between the measured output variables and the optimized output variables.

These residues can be designed—by means of decoupling from external disturbing forces—in such a fashion that they react very sensitively to an actual pinching process while remaining insensitive to external disturbances.

BRIEF DESCRIPTION OF THE DRAWING

Two exemplary embodiments of a method according to the invention are presented in the drawing and are described in greater detail in the subsequent description.

DETAILED DESCRIPTION OF THE INVENTION

Figure 1:
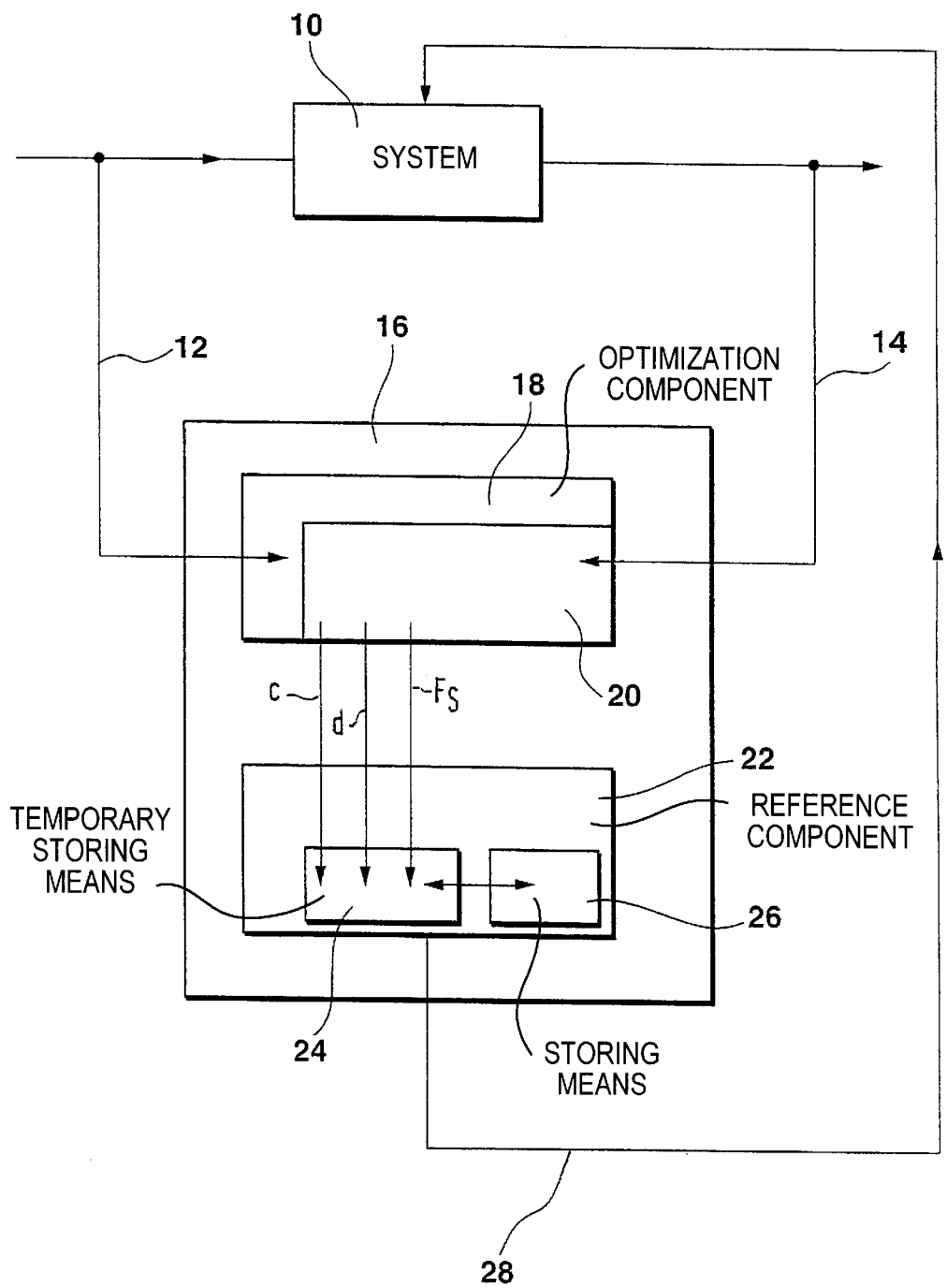
FIG. 1 is a course of the method according to the invention according to a first variant.

The exemplary embodiment—presented in FIG. 1—of a method according to the invention for electronically monitoring and controlling a process for adjusting movable parts shows a first variant, in which a voltage E, as input variable 12, is at a system 10 to be monitored. The output variable 14 is the position of the part to be adjusted. The input variable 12 and the output variable 14 of the system 10 to be monitored are fed to a detection device 16. This detection device 16 contains an optimization component 18, in which the differential equations $$m \cdot \ddot{x} = \bar{C} \cdot I + d \cdot \dot{x} + c \cdot \bar{x} + \bar{F}_d + m \cdot \bar{g}$$

and $$\bar{C} \cdot \dot{x} = -(L \cdot \dot{I}) + E + R \cdot I$$

are stored as the model depicting the mechanical processes.

In these equations, C is a constant, x is the speed of the movable part, L is the inductivity of the drive, I is the electrical current in the drive, $\dot{I}$ is the change over time of the electrical current in the drive, E is the electrical voltage at the drive, R is the electrical resistance of the drive, C·I is the driving force $F_D$, d is a damping term, c is the spring stiffness, $F_d$ is a disturbing force, and g is the gravitational constant.

In a subunit 20 of the optimization component 18, the output variable 14, that is, the position of the part to be adjusted, is calculated based on this model and using a specified, first set of parameters for the spring stiffness c, the damping term d, and the disturbing variable $F_d$.

Using a comparison of the position calculated based on this with the measured position, it is decided whether this first parameter set can continue to be used within the framework of a specified accuracy to evaluate the process, or whether the parameters c, d, and $F_d$ must be adapted to the changed system, due to fluctuating ambient conditions, for example. If the latter is the case, the set of parameters is optimized until the calculated system behavior or the calculated position also agrees with the measured system behavior or the measured position within the framework of a specified accuracy.

The parameters optimized and found in this fashion are then fed to a temporary storage 24 as part of a reference component 22. This reference component furthermore contains a storage device 26 in which reference values for the calculated set of parameters are stored.

The evaluation of the calculated and optimized parameters takes place based on a comparison with the parameters stored in the storage device 26 and that are relevant for the respective process step. A correcting quantity 28 is determined in dependence thereon, which is fed to the system 10 to be monitored or the on-going process. This makes it possible to influence the process more or less strongly depending on the correcting quantity 28 determined. For example, in the case of a strong deviation of the optimized spring stiffness c from the spring stiffness c stored in the storage device 26, a pinching process can be inferred, and a reversal or stoppage of the electronic drive 34 shown in FIG. 3 can be initiated.

Figure 2:
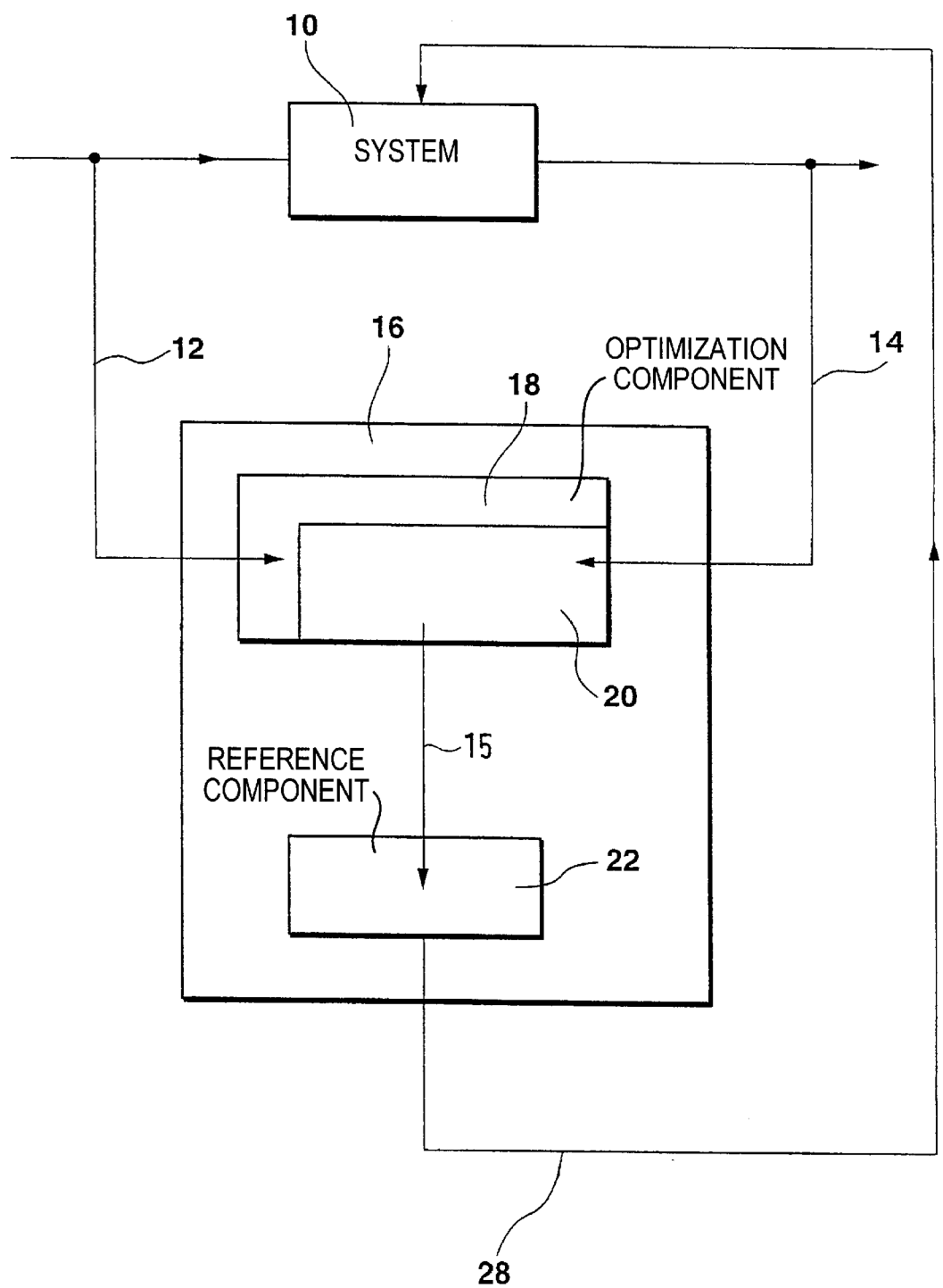
FIG. 2 is a course of the method according to the invention according to a second variant.

A second method variant is shown in FIG. 2, in which the same reference numerals are used for the same positions as in FIG. 1.

In this second method variant, the adjustment process is simulated in the detection device 16. This occurs with consideration for the measured input variable 12, in the case of voltage E, and the measured output variable 14—here, the position of the part to be adjusted—wherein the output variable is continuously calculated and adapted to the measured output variable 14. If the adaptation within certain limits is optimal, then the difference 15 between calculated and measured output variable is formed in the subunit 20. These differences 15, called residues, are forwarded to the evaluation component 22, which sends a correcting quantity 28 corresponding to the residue to the system 10 to be monitored. The correcting quantity 28 influences the process to be monitored exactly as in the first exemplary embodiment.

Figure 3:
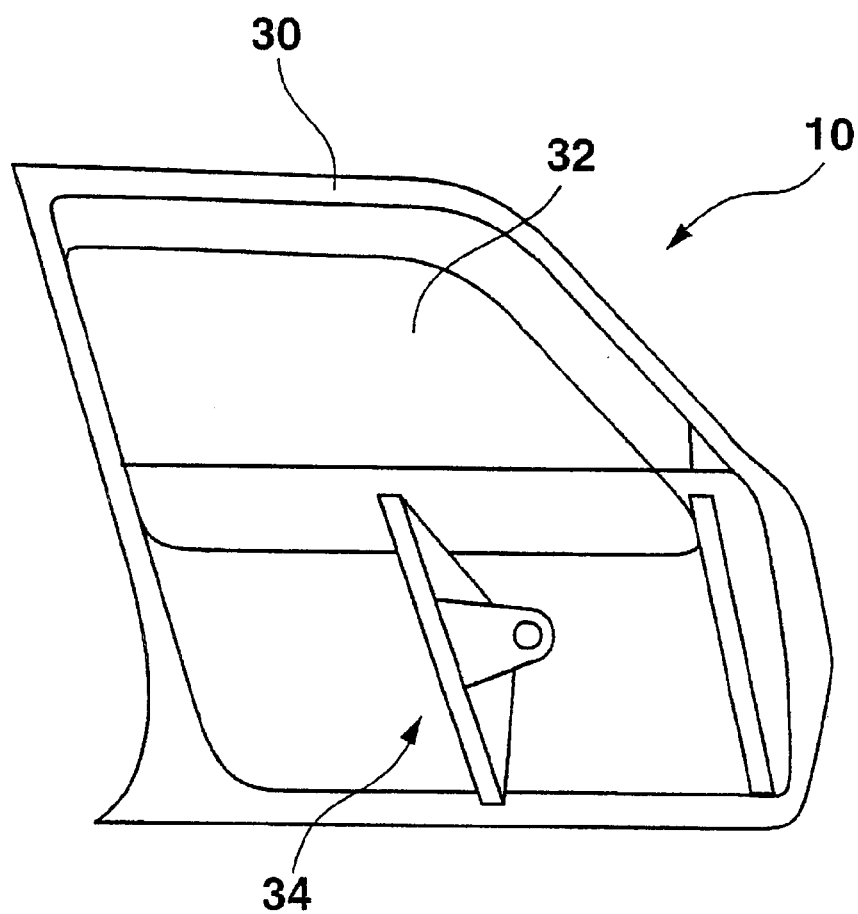
FIG. 3 is a device for using the method variants described.

A vehicle door 10 having a door frame 30 and a window pane 32 is shown in FIG. 3 as an example of a system to be monitored. The window pane 32 is driven by an electronic drive system 34, which makes it possible to open and close the window 32.

A monitoring of the opening and closing process of the window of a motor vehicle door shown in FIG. 3 can therefore be carried out using the two method variants already described in detail.

What is claimed is:

1. A method of electronically monitoring and controlling a process for adjusting movable parts, said movable parts including at least one of windows and sunroofs of a motor vehicle, to provide protection from pinching, said method comprising at least the following steps:

a) supplying to a detection device at least one input variable and at least one output variable characteristic of the process for adjusting the movable parts;

b) storing in the detection device a model describing the process for adjusting at least one of the movable parts in terms of process variables, wherein the model comprises a differential equation of the form $$m \cdot \vec{\ddot{x}} = \vec{F}$$

wherein m is mass; $\ddot{x}$ is acceleration of the at least one of the movable parts, and F is the sum of the forces acting thereon;

c) optimizing the process variables of the model according to the at least one input variable and at least one output variable and storing values of the process variables in the detection device;

d) continually evaluating current values of the process variables obtained by optimizing by means of a comparison of the current values with the values of the process variables stored in step c);

e) calculating in the detection device a correcting quantity for the process for adjusting the at least one of the movable parts according to said comparison; and f) influencing said process for adjusting the at least one of the movable parts by feeding the correcting quantity into the process.

2. The method as defined in claim 1, wherein said differential equation is of the form $$m \cdot \vec{\ddot{x}} = \vec{C} \cdot I + d \cdot + e, dot\ \vec{\dot{x}} + ee + c \cdot x + \vec{F}_d + m \cdot \vec{g}$$

wherein C=constant, I=electric current in an electrical drive means for adjusting the at least one of the movable parts, C·I=driving force $F_D$, d=damping term, $\dot{x}$=speed of the at least one of the movable parts, c=spring stiffness, $F_d$=disturbing force and g=gravitational constant.

3. The method as defined in claim 2, wherein a model for the behavior of the electric current is stored in said detection device.

4. The method as defined in claim 3, wherein said model for the behavior of the electric current is of the form $F_D$=f(E,I) wherein I is said current and E is a voltage applied to said drive means.

5. The method as defined in claim 4, wherein said electrical drive means comprises at least one permanent magnet D.C. motor and said model for the behavior of the electric current comprises a differential equation of the form $$\vec{C} \cdot +e,dot\ \vec{x} +ee =-(L\cdot \dot{I})+E+R\cdot I$$

wherein C=constant, $\dot{x}$=the speed of the at least one of the movable parts, L=inductivity of the drive means, I=the current, $\dot{I}$=the time rate of change of the current, E=the voltage applied to the drive means, and R=the resistance of the drive means.

6. The method as defined in claim 4, wherein said at least one input variable comprises said voltage applied to the drive means.

7. The method as defined in claim 4, wherein said at least one output variable is at least one of said current in said drive means, a position of said at least one of said movable parts, an angular position of a rotating part of said drive means, a time rate of change of said position of said at least one of said movable parts and a time rate of change of said angular position of said rotating part.

8. The method as defined in claim 2, wherein, for monitoring said process of adjusting said movable parts, the spring stiffness and the damping term are process parameters optimized considering said at least one input variable and said at least one output variable and optimized values of the spring stiffness and the damping term are stored.

9. The method as defined in claim 8, wherein said correcting quantity is calculated from a comparing of newly calculated and optimized values of the spring stiffness and the damping term with said optimized values that are stored.

10. The method as defined in claim 8, wherein said correcting quantity is calculated by comparing a current behavior of said spring stiffness and said damping term with said optimized values that are stored.

11. The method as defined in claim 9 or 10, wherein said influencing of said process includes reversing or stopping said drive means when a pinching event is detected by said comparing.

12. The method as defined in claim 9 or 10, wherein said optimized values of said spring stiffness and said damping term that are stored are adapted to changing conditions.

13. The method as defined in claim 9 or 10, wherein for the monitoring of the process, the disturbance variable $F_d$ is also calculated and optimized according to said at least one input variable and said at least one output variable.

14. The method as defined in claim 1, wherein said at least one output variable consists of a plurality of process output variables and said at least one input variable consists of a plurality of process input variables and further comprising optimizing at least one of said process output variables taking into account measured values of the process input variables and measured values of the process output variables.

15. The method as defined in claim 14, further comprising forming residues according to at least one difference between optimized process output variables and currently measured process output variables.

16. The method as defined in claim 15, further comprising distinguishing between the pinching process and other external disturbances according to said residues to establish whether or not a pinching event has occurred.

* * * * *